UNITED STATES PATENT OFFICE.

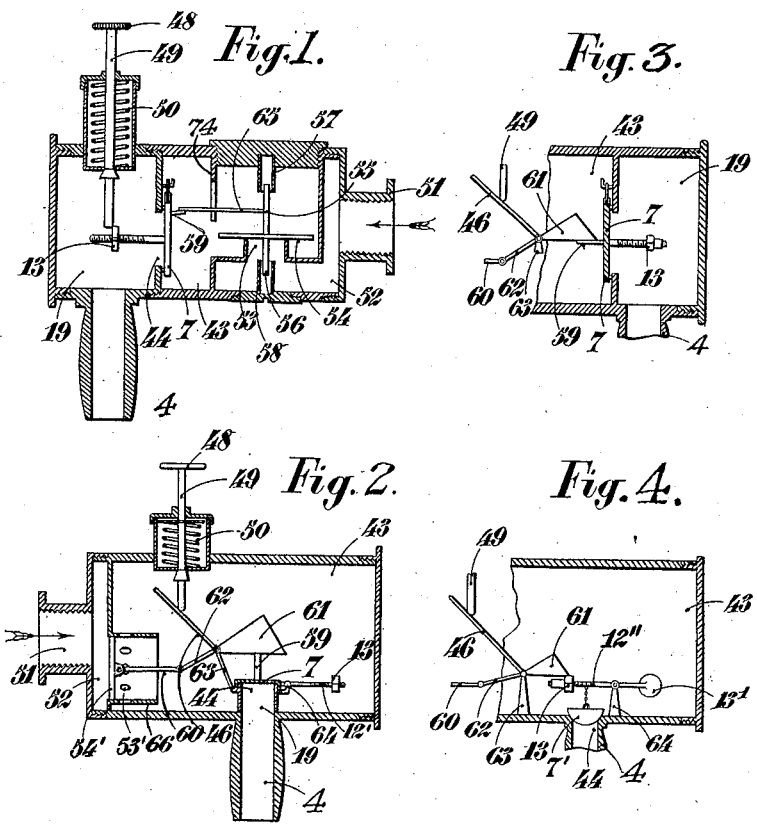

GERMAIN FRÉDÉRIC PICOT, OF PARIS, FRANCE.

SAFETY DEVICE FOR GAS-SUPPLY APPARATUS.

1,078,163. Specification of Letters Patent. Patented Nov. 11, 1913.

Application filed December 18, 1911. Serial No. 666,543.

*To all whom it may concern:*

Be it known that I, GERMAIN FRÉDÉRIC PICOT, a citizen of the French Republic, residing at Paris, Department of the Seine, in France, have invented certain new and useful Improvements in or Relating to Safety Devices for Gas-Supply Apparatus; and I do hereby declare the following to be a full, clear, and exact description of the invention, such as will enable others skilled in the art to which it appertains to make and use the same.

The present invention has for its object the provision of a safety device particularly applicable to gas conduits and intended to automatically cut off the supply of gas if a leakage occurs in the gas pipe.

This apparatus comprises a valve opening inversely to the flow of gas and balanced by means of a counterweight adjustable in such a manner as to hold the valve open in normal operation. In case of an important leakage at a point beyond the valve, the valve is applied to its seat owing to the reduction of pressure due to said leakage.

There is arranged in the apparatus in advance of the principal valve, an auxiliary valve which is maintained raised by the flow of the gas. As soon as the supply ceases, the auxiliary valve falls onto its seat and acts upon the principal valve which it causes to close.

In the accompanying drawings:—Figure 1 represents in section a device in which an additional or auxiliary valve is arranged in advance of the principal valve in such a manner as to cause the principal valve to close when the auxiliary valve falls back upon its seat. Figs. 2, 3 and 4 show in section slightly modified devices.

In the device represented in Fig. 1, the gas entering through a conduit 51 connected with the main pipe reaches a chamber 52 in which there is an opening 53 closed by a valve 54 fixed to two counter rods 55, 56 which move in guides 57, 58.

Through the opening 53 the chamber 52 communicates with the chamber 43 in which there is arranged the vertical valve 7 pivotally suspended from the wall of the chamber. This valve which is balanced by a counterweight 13, regulates the passage of the gas according to the pressure. A projection 59 formed on the valve 7 is in engagement with a horizontal rod 65 fixed to the counter rod 55 and guided by a slot formed in the partition 74. Normally, the rod 65 bears upon the projection 59 and holds the valve 7 to its seat. Through an opening 44, the chamber 43 communicates with the chamber 19. At the lower part of this last-named chamber or at some other place there is arranged a discharge nipple 4 to which a pipe may be connected to conduct the gas to the desired place. This nipple may be provided with a cock, if desired.

Above the chamber 19, there is arranged a knob 48 integral with a rod 49 and acted upon by a counter-spring 50 or equivalent device. When the knob 48 is depressed the end of the rod 49 bears upon the extremity of the threaded rod of the counter-weight 13.

The operation is as follows: Normally, when gas is being admitted to the apparatus, if the vertical valve 7 is opened by pressing on the knob 48, the gas lifts the horizontal valve 54, and the latter remains raised so long as the valve 7 permits of the passage of gas to the utilization apparatus. The valve 7 remains open under the action of counter-weight 13, so long as the pressure is substantially equal on both sides thereof. If a breakage should occur in the pipe beyond the safety apparatus, the pressure in the pipe on the outlet side of the apparatus is reduced and under the influence of the pressure of the gas in advance of the device (which is greater than atmospheric pressure), the valve 7 closes and instantaneously prevents the escape of gas. If, on the other hand, the supply of gas is stopped for any reason, the horizontal valve 54 is no longer supported by the excess pressure from beneath it, and when it falls back upon its seat, the rod 65 bears upon the projection 59, and thereby closes the valve 7. In order to restart the apparatus, the knob 48 is pressed, the rod of the counter-weight 13 is thus pressed back by means of the rod 49, and consequently the valve 7 is unseated. It will be seen that in this construction, the valve 54 cannot rise if the passage of a current of gas has not been produced by opening the valve 7, because a counter-pressure is established above this valve, which does not form a perfect joint.

In the construction shown in Fig. 2, the gas entering through the pipe 51 reaches the chamber 52, the bottom of which carries a cylindrical socket 66 provided with perforations 53'. In this socket, a piston valve 54' is mounted for reciprocation. To the valve 54', there is pivoted a rod 60 pivoted to one of the arms 62 of a bell-crank lever 46. The bell-crank lever 46 is pivoted to the top of a supporting rod 63. Through the openings 53', the chamber 52 communicates with the chamber 43 in which there is arranged the principal valve 7 provided with a threaded rod 12' carrying an adjustable counterweight 13. This rod is mounted to oscillate around a shaft 64 in a support fixed to the wall of the chamber 43. The valve also carries a projection 59 upon which the member 61 forming the counter-weight of the lever 46, rests. Through an opening 44, the chamber 43 communicates with a chamber 19 at the lower part of which a nipple is arranged to which piping or tubing may be connected to supply the utilization apparatus. Above the chamber 43 there is arranged a knob 48, the rod 49 of which is under the influence of a counter-spring 50 and is in contact with the upper arm of lever 46.

The operation of this construction is as follows:—In normal operation, the knob 48 is acted upon, and moves the bell-crank lever 46 to operate the piston valve 54' which uncovers the apertures 53'. Simultaneously, the weight 61 is lifted, and releases the valve 7, which opens under the influence of the counter-weight 13. The gas passing through the openings 53' holds the piston valve 54' in place; the pressure being substantially equal on both sides of the valve 7, it will remain open, due to the counter-weight 13. The gas passing through the nipple 4 is conducted to the utilization apparatus. If the pipe should break beyond the safety apparatus, the pressure in the outlet portion of the pipe falls, and under the influence of the gas pressure on the inlet side thereof, the valve 7 closes and prevents the escape of gas. If, on the other hand, the supply of gas should stop for any reason, the piston valve is no longer acted upon by the excess pressure of the gas and moves back under the influence of the weight 61, which then bears upon the projection 59 of the valve 7 and serves to apply it to its seat. Consequently, when the supply of gas is reestablished, the valve 7 remains closed and the gas cannot escape to the exterior.

It will be noted that when the knob 48 is depressed, the weight 61 is moved to substantially a vertical position and its center of gravity is therefore shifted closer to the axis of the bell crank lever 46. The force couple tending to rotate the weight around the axis of the bell crank lever is therefore very slight. On the contrary, when the valve is closed, a relatively large force is necessary to raise the weight 61, because the force couple is greater, due to the fact that the center of gravity of the weight is farther from the axis of the bell crank lever. It is seen, therefore, that when the valve is once closed by the lowering of the weight, the reëstablishment of the gas supply will have no effect in lifting the weight 61, but when said valve has once been opened, the pressure of the gas supply is sufficient to hold the weight in the raised position, due to the fact that the center of gravity thereof is nearer to the axis of the bell crank lever than in the closed position of the valve. In order to furnish a supply to the utilization apparatus again, it is necessary to actuate the rod 49, as described above.

The device illustrated in Fig. 3 is a modification in which the valve 7 is suspended from the wall of the chamber 43. As in the device illustrated in Fig. 1, this valve carries an adjustable counter-weight 13 and also a counter-rod 59 upon which the counter-weight 61 of the lever 46 bears. The operation of this valve is identical with that illustrated in Fig. 2.

Fig. 4 represents a modification of the valve shown in Fig. 2. This is constituted by a hemispherical valve 7' connected with a threaded rod pivoted to a support 64 and carrying two counter-weights 13 and 13'. The counter-weight 13 which is movable upon the threaded rod 12'' receives the extremity of the counter-weight 61 carried by the bell-crank lever 46.

What I claim is:—

1. Safety valve mechanism comprising a casing through which the medium to be controlled flows, an inlet and outlet in said casing, a counter-balanced valve therein, said valve adapted to automatically close when the pressure of the medium at the inlet end of the casing exceeds to a predetermined extent that at the outlet end but adapted to remain open when said pressures are equal, and means interposed in the path of the incoming medium and operable when the flow of medium ceases to close said valve.

2. Safety valve mechanism comprising a casing through which the medium to be controlled flows, an inlet and outlet in said casing, a counter-balanced valve therein, said valve adapted to automatically close when the pressure of the medium at the inlet end of the casing exceeds to a predetermined extent that at the outlet end but adapted to remain open when said pressures are equal, means interposed in the path of the incoming medium and operable when the flow of medium ceases to close said valve, and manually operable means to open said valve.

3. Safety valve mechanism comprising a casing through which the medium to be controlled flows, an inlet and outlet in said casing, a counter-balanced valve therein, said valve adapted to automatically close when the pressure of the medium at the inlet end of the casing exceeds to a predetermined extent that at the outlet end but adapted to remain open when said pressures are equal, a pivotally mounted element in the casing having engagement with said valve and normally tending to close the same, said element disposed in the path of the incoming medium the pressure of which holds said element in a position that permits said valve to remain open, said element adapted to automatically operate when the flow of the medium ceases to close said valve, and manually operable means to open said valve.

In testimony whereof I affix my signature, in presence of two witnesses.

GERMAIN FRÉDÉRIC PICOT.

Witnesses:
H. C. COXE,
EMILE KLOTZ.

Copies of this patent may be obtained for five cents each, by addressing the "Commissioner of Patents, Washington, D. C."